Oct. 1, 1968 D. W. BATT ET AL 3,404,234

CONFESSIONAL CONSTRUCTION

Filed May 28, 1964

INVENTORS.
FATHER DACIAN W. BATT
FATHER MAYNARD TETREAULT
BY Pearce and Schaeperklaus
Attorneys.

3,404,234
CONFESSIONAL CONSTRUCTION

Dacian W. Batt and Maynard M. Tetreault, both of 4536 Vine St., St. Bernard, Ohio 45217

Filed May 28, 1964, Ser. No. 370,994
3 Claims. (Cl. 179—1)

ABSTRACT OF THE DISCLOSURE

A telephone equipped confessional in which the operation of the telephones is controlled by switch means operated by a priest and in which, while the telephones are inoperative, a warning light can be actuated by switch means operable by the penitent.

This invention relates to the structure of confessionals. More particularly, this invention relates to a confessional having telephonic equipment for communication between confessor and penitent.

An object of this invention is to provide a telephone arrangement for use in a confessional between confessor and penitent in which a strong signal is produced sufficient for penitents who may be hard of hearing.

A further object of this invention is to provide such a telephone arrangement for a confessional in which the circuit is arranged that only a single pair of microphones and a single pair of receivers are mounted in the circuit.

A further object of this invention is to provide such a telephone arrangement for a confessional in which a warning light in the confessor's compartment is lighted when the penitent raises his telephone instrument and is extinguished when the priest raises his instrument.

The above and other objects of the invention will be apparent to those skilled in the art to which this invention pertains, from the following detailed description and the drawing, in which.

In the following detailed description, and the drawing, like reference characters indicate like parts.

Figures 1, 2, 3:
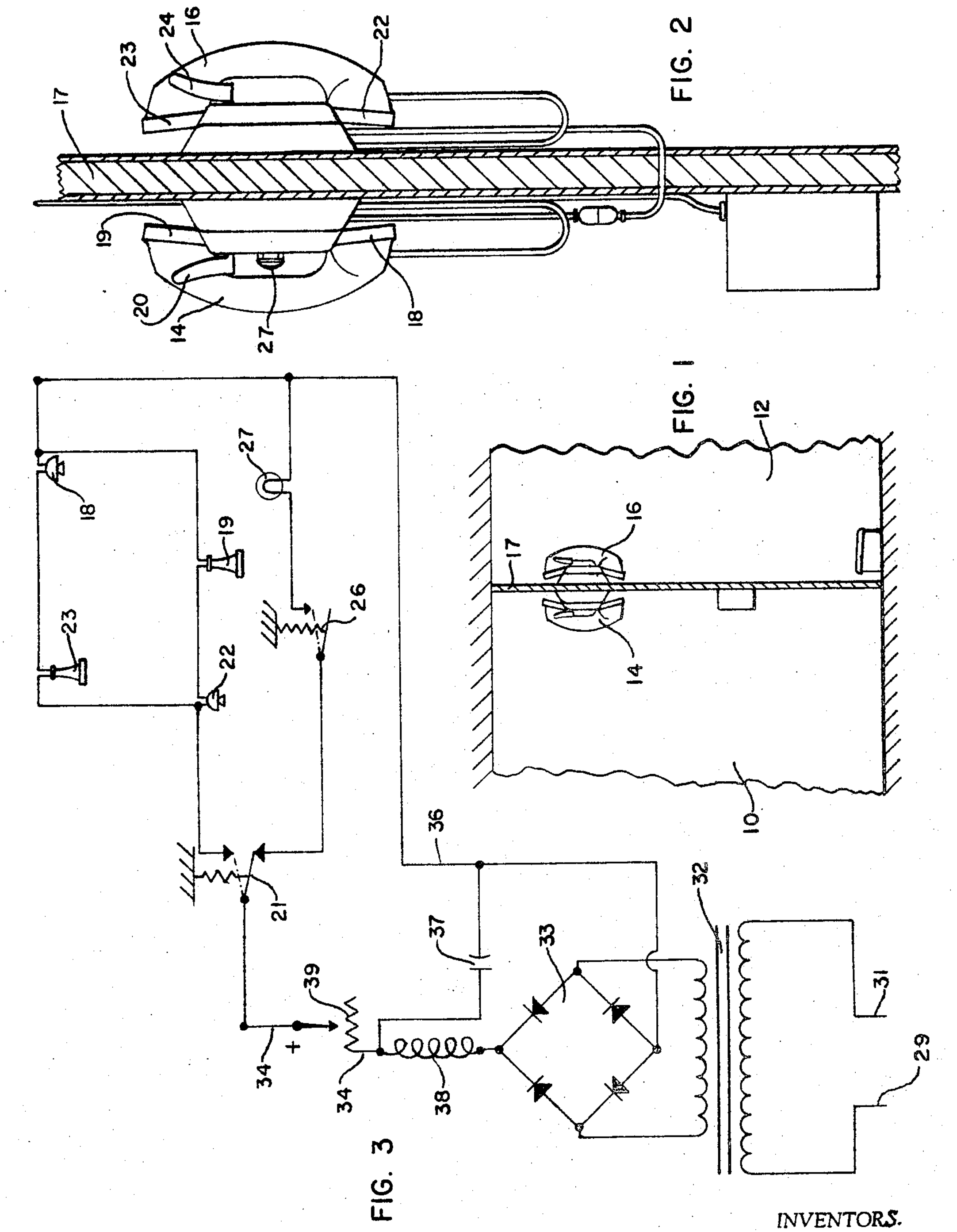
FIG. 1 is a fragmentary view partly in side elevation and partly in section showing a pair of confessional chambers, the chambers being constructed in accordance with an embodiment of this invention.
FIG. 2 is an enlarged view in section through a wall separating the chambers.
FIG. 3 is a schematic wiring diagram thereof.

In FIG. 1 is shown a confessional including a confessor's compartment 10 and a penitent's compartment 12. In the confessor's compartment is located a telephone handset 14 and in the penitent's compartment is located a second telephone handset 16. The telephone instruments can be mounted on a wall 17 which separates the compartments.

As shown in FIG. 2, the handset 14 has a mouthpiece 18 and a receiver portion 19 and can hang on a conventional switch-operating hook 20. A switch 21 (FIG. 3) is operated by the hook 20. Similarly, the handset 16 (FIG. 2) in the penitent's chamber includes a mouthpiece 22 and a receiver portion 23 and can hang on a switch-operating hook 24 which operates a switch 26 (FIG. 3). Referring again to FIG. 2, a warning light 27 is mounted in the confessor's compartment. The handsets can be of the type common in telephone circuits.

The operation of the device can be understood more fully by reference to FIG. 3 which is a circuit diagram thereof.

Power for the device is introduced through line leads 29 and 31. The line leads energize a transformer 32 which is connected to a rectifier 33, which can be a copper oxide type rectifier, and which supplies unidirectional voltage to leads 34 and 36. An appropriate condenser 37 and inductance 38 can be connected across the rectifier as shown. The voltage supplied is regulated by a potentiometer 39.

When the penitent raises his handset, the switch 26 is released to close and energize the warning lamp 27. However, the phone circuit remains unenergized. Then, when the confessor raises his handset, the switch 21 is released to swing from the full line position of FIG. 3 to the dot-dash line position energizing the telephone circuit and de-energizing the lamp 27.

As shown, the confessor's mouthpiece 18 and the penitent's receiver 23 are connected in series across the leads 34 and 36, and the penitent's mouthpiece 22 and the confessor's receiver 19 are similarly connected in series across the leads 34 and 36. As will be apparent, this arrangement is designed for and works only with a single pair of telephone instruments, assuring the privacy of communication between the confessor and penitent and substantially limiting reproduction of the penitent's confession to the confessor's receiver 19 and reproduction of the confessor's response to the penitent's receiver 23.

The mouthpieces 18 and 22 include microphones which are responsive to a predetermined range of sound frequencies of the human voice while the receivers 19 and 23 preferably produce sound frequencies in a further restricted range in response to activation of the microphones mentioned. Such frequency alteration between the sound source and the preception of the sound by the listener, whether confessor or penitent, is of great benefit in communication to many listeners having impaired hearing.

The confessional arrangement illustrated in the drawing and described above is subject to structural modification without departing from the spirit and scope of the appended claims.

Having described our invention, what we claim as new and desire to secure by Letters Patent is:

1. A confessional which comprises first and second compartments, a telephone instrument in each of said compartments, each of said instruments including a transmitter, a receiver, and a switch, a lamp in said first compartment, a pair of power leads, means for connecting the lamp between the power leads in series with respective pairs of closable contacts of both switches, the switch in said first compartment having a first position in which the contacts in series with the lamp are closed and a second position in which another pair of contacts are closed, and a telephone circuit connected between the power leads in series with said other pair of closable contacts of the switch in said first compartment, said telephone circuit including two parallel branches, each of said branches including a respective transmitter in one compartment and a respective receiver in the other compartment and series connections therebetween whereby said switch in said first compartment alone controls said telephone circuit and said switch in said second compartment can be closed to actuate said lamp only when the closable contacts of the switch in said first compartment connected in series with said lamp between said power leads are closed.

2. A confessional which comprises first and second compartments, a telephone instrument in each of said compartments, each of said instruments including a transmitter and a receiver, a pair of power leads, a telephone circuit connected between the power leads, said telephone circuit including two parallel branches, each of said branches including a respective transmitter in one compartment and a respective receiver in the other compartment and series connections therebetween, in said first compartment a first switch in said telephone circuit between said parallel branches and one of said power leads and actuatable to open and close said telephone circuit, a lamp circuit extending parallel to the branch containing portion of the telephone circuit from said first switch to the same one of said power leads, said first switch being actuatable to connect the lamp circuit to a second power lead when said telephone circuit is open, and a second switch in said second compartment for opening and closing the lamp circuit when said lamp circuit is otherwise complete between said pair of power leads.

3. A confessional which comprises first and second compartments, a telephone instrument in each of said compartments, each of said instruments including a transmitter and a receiver, a first switch in said first compartment, a pair of power leads, a telephone circuit connected between the power leads in series with a pair of contacts of said first switch, said telephone circuit including two parallel branches, each of said branches including a respective transmitter in one compartment and a respective receiver in the other compartment and series connections therebetween, said first switch being actuatable by an occupant of said first compartment to open and close said telephone circuit, a lamp circuit extending from said first switch in parallel to the branch containing portion of the telephone circuit to the same power lead, said first switch being actuatable to connect the lamp circuit to a second power lead when said telephone circuit is open, and a second switch actuatable by an occupant of said second compartment for opening and closing the lamp circuit when said lamp circuit is otherwise complete through said first switch between said pair of power leads.

References Cited

UNITED STATES PATENTS

| | | | |
|---|---|---|---|
| 2,424,348 | 7/1947 | Casson | 179—1 |
| 2,252,549 | 8/1941 | Beadford et al. | 179—1 |
| 2,283,646 | 5/1942 | Nicholas | 179—1 |
| 2,889,401 | 6/1959 | Finkbeiner | 179—1 |

KATHLEEN H. CLAFFY, *Primary Examiner.*

A. GESS, *Assistant Examiner.*